United States Patent [19]

Kodaira

[11] Patent Number: 4,536,068
[45] Date of Patent: Aug. 20, 1985

[54] FOCAL LENGTH CHANGEABLE CAMERA

[75] Inventor: Takanori Kodaira, Tokyo, Japan

[73] Assignee: Canon Kabushiki Kaisha, Tokyo, Japan

[21] Appl. No.: 593,813

[22] Filed: Mar. 27, 1984

[30] Foreign Application Priority Data

Mar. 28, 1983 [JP] Japan .................................. 58-52031
Mar. 28, 1983 [JP] Japan .................................. 58-52032

[51] Int. Cl.³ ........................ G03B 3/00; G03B 17/38
[52] U.S. Cl. ............................ 354/195.12; 354/268
[58] Field of Search ............... 354/195.12, 187, 191, 354/234.1, 235.1, 268

[56] References Cited

U.S. PATENT DOCUMENTS 3,903,537  9/1975  Ettischer .................... 354/268 X
4,214,829  7/1980  Ohashi ..................... 354/195.12

Primary Examiner—William B. Perkey
Attorney, Agent, or Firm—Toren, McGeady, Stanger, Goldberg & Kiel

[57] ABSTRACT

A camera having an objective lens system with a master lens in a standard operative position constituting a first focal length lens system. When the master lens is moved forward to a telephoto position, an auxiliary lens is automatically inserted into and seated in a space behind the master lens in axial alignment therewith, whereby a second focal length lens system is formed. In such camera, the master lens is made movable to a certain position intervening between the standard and telephoto positions, while maintaining the auxiliary lens stationary in the retracted position from the rear optical path of the master lens. With the master lens in the intermediate position, when a close-up mode selector switch is actuated, the master lens is locked in that intermediate position.

4 Claims, 17 Drawing Figures

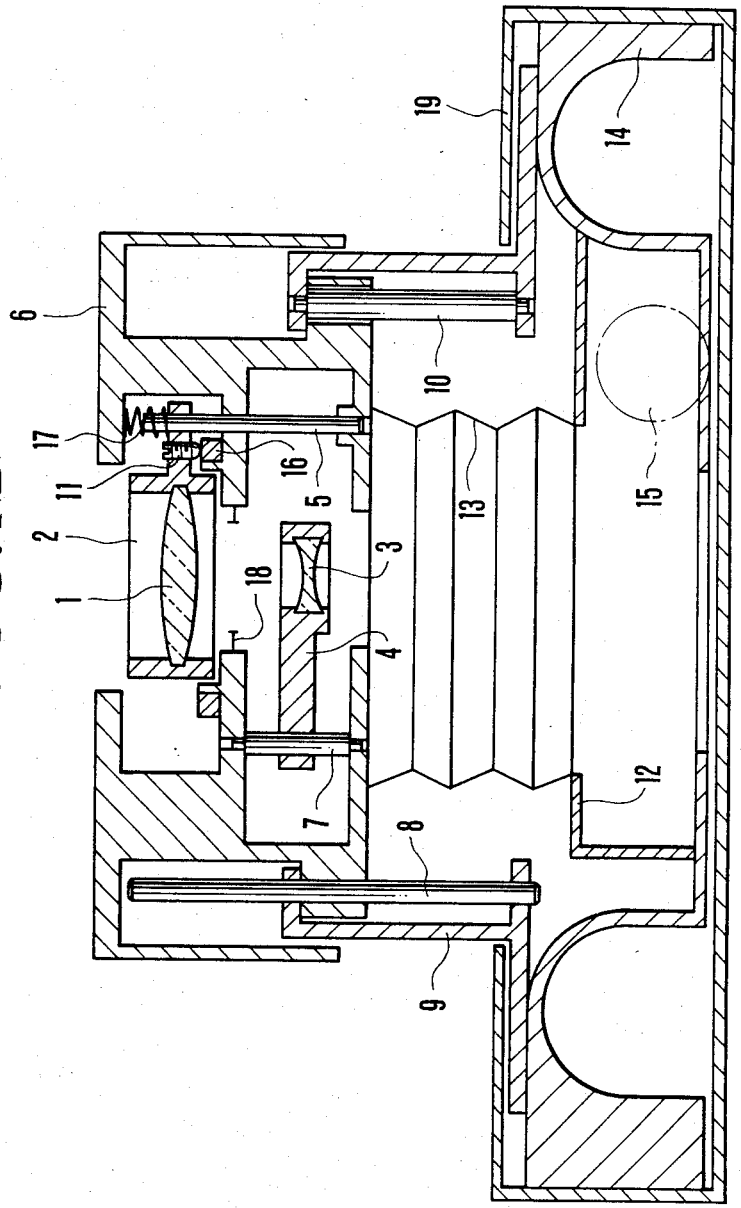

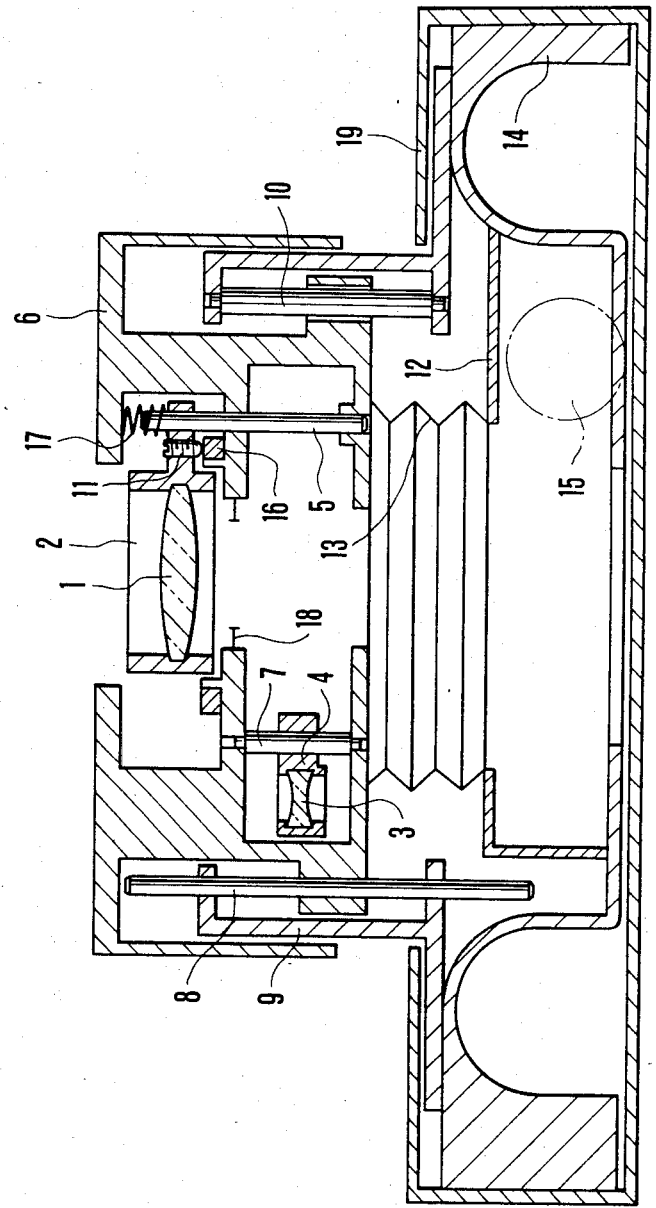

FIG.4(A)       FIG.4(B)
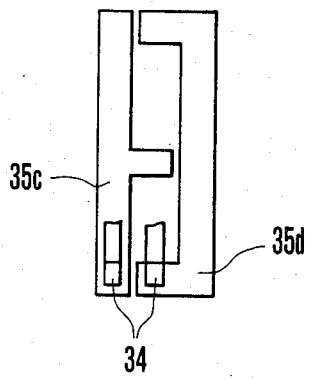
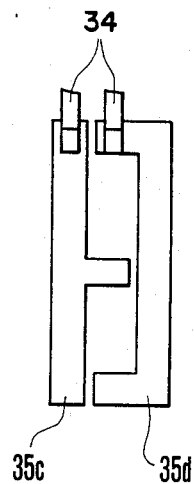
FIG.4(C)       FIG.4(D)
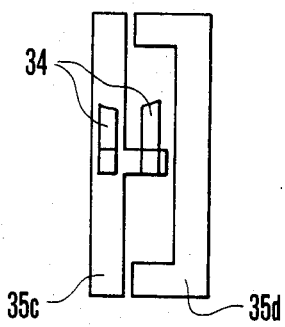
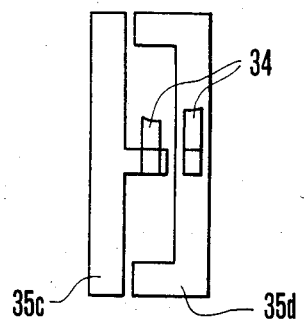

FOCAL LENGTH CHANGEABLE CAMERA

BACKGROUND OF THE INVENTION

1. Field of the Invention

This invention relates to a camera capable of changing the focal length by bringing an auxiliary lens into axial alignment with a master lens.

2. Description of the Prior Art

It is known to provide a focal length changeable camera in which when a master lens system only is in use, standard photography with a short focal length is carried out, and when the master lens system is in a forward position there is provided rearwardly thrust an auxiliary lens system, whereby telephotography may be effected. A device of this type is, for example, disclosed in U.S. Pat. No. 3,388,650, and Japanese Laid-Open Patent Applications Nos. Sho 52-76919 and Sho 54-33027.

However, such focal length changeable camera, though it is capable of performing standard photography and telephotography, cannot perform close-up photography. There has, therefore, occurred a demand to make that camera capable of performing close-up photography. Also the prior art focal length changeable camera involves the possibility of occurrence of faulty operation in that film exposure may occur during the change over between the focal lengths.

An object of the present invention is to eliminate the above-described drawbacks, and to make close-up photography possible by moving the master lens forward to a predetermined intermediate position between the standard and telephoto exposure positions, while leaving the auxiliary lens retracted from the rear optical path.

Another object of the present invention is to lock the aforesaid master lens in the predetermined position by setting a mode selector member in a close-up position.

Another object of the present invention is to prohibit a release actuation except when the master lens is in the standard or the telephoto position.

Another object of the present invention is to remove the release actuation prohibiting condition in the close-up exposure position of the master lens when the mode selector member is set in the close-up position.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

BRIEF DESCRIPTION OF THE DRAWINGS

FIG. 1(B) is a lateral sectional view of the camera of FIG. 1(A) in a telephoto position.

FIG. 1(C) is a lateral sectional view of the camera of FIG. 1(A) in a close-up position.

FIG. 4(A) illustrates the details of the switches of FIG. 3 in the standard photographing position.

FIG. 4(B) is similar to FIG. 4(A) except that the telephoto position is illustrated.

FIG. 4(C) is similar to FIG. 4(A) except that the close-up position is illustrated.

FIG. 4(D) is similar to FIG. 4(C) except that the close-up position is locked.

DETAILED DESCRIPTION OF THE PREFERRED EMBODIMENT

Figure 1A:
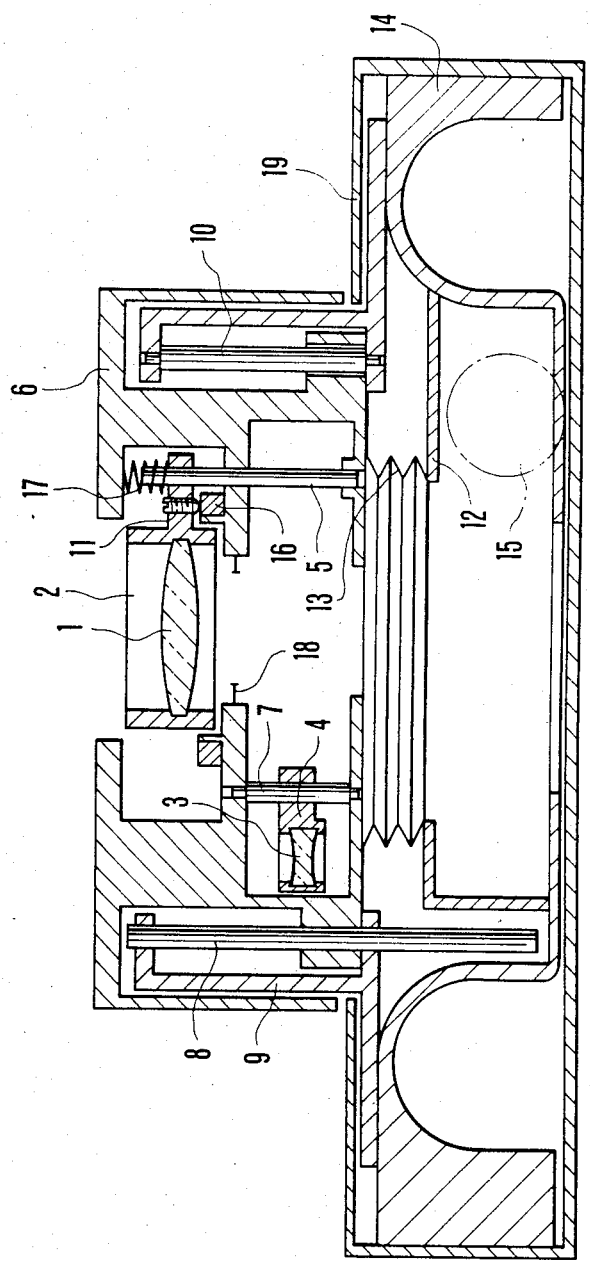
FIG. 1(A) is a lateral sectional view of an embodiment of the focal length changeable camera according to the present invention in a standard photographing position.

FIGS. 1(A) to 1(C) illustrate the focal length changeable camera in the standard, telephoto and close-up photographing positions respectively.

In the drawings, 1 is a master lens, this master lens 1 being held in a barrel 2. Another or auxiliary lens 3 lies behind the master lens 1 on the left hand side of an optical axis of the master lens 1. The auxiliary lens 3 is held in an extender 4. The barrel 2 is fixedly mounted to a bar 5 held in two fitted holes in a cover unit 6. The extender 4 has a bar of which both ends are held in fitted holes in the cover unit 6 on the left hand side thereof. And, the extender 4 is rotatable about the bar 7.

A support bar 8 is fixedly mounted to the cover unit 6 at the left hand side thereof. The cover unit 6 is slidingly movable relative to a holder plate 9, and the support bar 8 is held in two fitted holes of the holder plate 9 to slidingly move relative to the holder plate 9. Still another or guide bar 10 has its two end portions fixedly mounted to the holder plate 9. The cover unit 6 is movably fitted on the guide bar 10 at the right hand side thereof. Therefore, the cover unit 6 is axially movable along with the support bar 8 and is guided by the guide bar 10. A focus adjusting screw 11 is threadedly engaged in the barrel 2 and abuts against a camming surface of a ring 16 rotatably fitted on an annular extension of the cover unit 6 about the optical axis of the master lens 1. At the front end of the barrel bar 5 there is also shown a compressed spring 17 between the cover unit 6 and the barrel 2 by which spring 17 is urged the focus adjusting screw 11 to abut on the camming surface of the rotatable ring 16. When the ring 16 is rotated by means (not shown), the barrel 2 moves axially forward. At the rear of the cover unit 6 there is shown a camera body 14 with a light shielding plate 12 at the center of the longitudinal length. A bellows 13 lies between this light shielding plate 12 and the cover unit 6. A sprocket 15 is positioned within the camera body 14 behind the light shielding plate 12. 18 is a shutter behind the barrel 2. 19 is a camera casing. Between the camera body 14 and the cover unit 6 there is a click mechanism (not shown) for stopping the cover unit 6 in three different axial positions, consisting of the standard photographing position of FIG. 1(A), the telephoto position of FIG. 1(B) and the close-up position of FIG. 1(C). And by pulling or pushing the cover unit 6 out of or into the camera casing 19, any one of these positions can be selected.

When the cover unit 6 is pulled out by increments of one click stop from the position of FIG. 1(A), the standard photography position, an intermediate position of FIG. 1(C), or the close-up position, is reached. During this forward axial movement of the cover unit 6, the extender 4 is maintained constant in a retracted position out of the optical path in the rear space of the master lens 1. As a result, only the master lens 1 takes moved an increased distance from the focal plane, permitting close-up photography to be performed. As the cover unit 6 is further pulled out from this close-up position, or the position of FIG. 1(C), the extender 4 is automatically turned by means (as will be described later) about the bar 7 until the auxiliary lens 3 is axially aligned with the master lens 1, and then held stationary in this angular position. Soon after that, the cover unit 6 is stopped by the click mechanism in the telephoto position, that is, the position of FIG. 1(B).

Figure 2A:
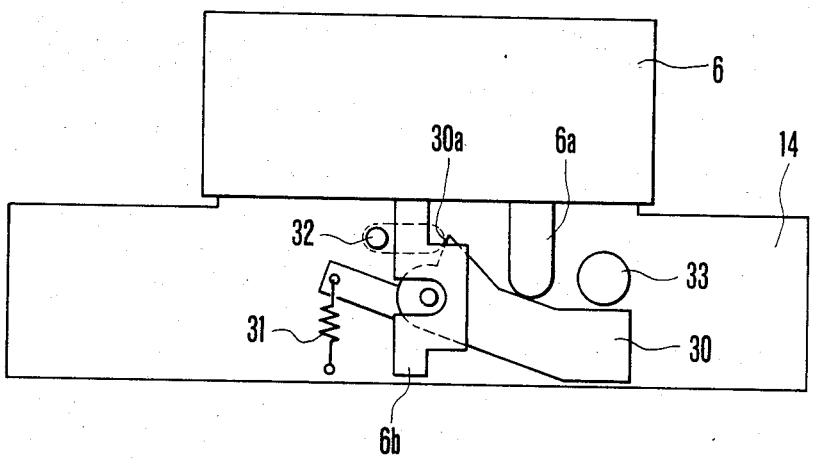
FIG. 2(A) is a plan view of a release lock mechanism of the camera of FIG. 1(A) in the standard photographing position.

FIGS. 2(A) to 2(D) illustrate different operative positions of a release lock mechanism with a close-up mode switch in the embodiment of the present invention. A release lock lever 30 is pivotally mounted on the camera housing 14. A spring 31 between the left hand end of the release lock lever 30 and the camera housing 14 urges the release lock lever 30 to turn counterclockwise. A close-up mode switch 32 when moved from a position of FIG. 2(A) to another position of FIG. 2(D) sets a camera control circuit (not shown) in the close-up mode, as it is laterally movable relative to the camera housing 14. This close-up mode switch 32 is arranged to be able to abut on a pawled portion 30a of the release lock lever 30. A release button 33 is positioned above a path of movement of the right hand end of the release lock lever 30. A release lock removal member 6a rearwardly extends from the cover unit 6 to abut against the side edge of the release lock member 30. A close-up mode switch lock member 6b rearwardly extending from the cover unit 6 is arranged to be engageable with the close-up mode switch 32. FIG. 2(A) represents the standard photographing position. Standard photography is performed with the cover unit 6 in the contracted position. Therefore, the release lock removal member 6a and the close-up mode switch lock member 6b also occupy their rearmost positions just above the camera body 14. Therefore, the release lock removal member 6a holds the release lock member 30 out of the path of movement of the release button 33 against the force of the spring 31, thus permitting standard photography to be carried out. On the other hand, it is in this position that the close-up mode switch 32 is hindered from moving to the right by the lock member 6b. In other words, locking of the close-up mode switch 32 is effected.

Figure 2B:
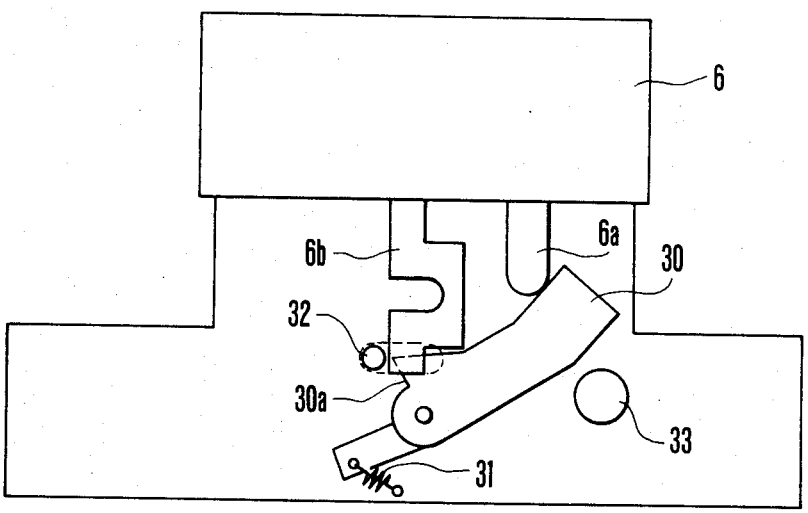
FIG. 2(B) is similar to FIG. 2(A) except that the telephoto position is illustrated.

FIG. 2(B) represents the telephoto position with the cover unit 6 in the forwardmost position. Therefore, the release lock removal member 6a is moved to a forwardmost position. Since the release lock member 30 is urged to abut on the release lock removal member 6a, it follows up the release lock removal member 6a under the action of the spring 31, while turning counterclockwise past below the release button 33. Therefore, it is also in the telephoto position that the release lock member 30 does not hinder the release button 33 from being actuated, and that the close-up mode switch 32 is locked by the lock member 6b.

Figure 2C:
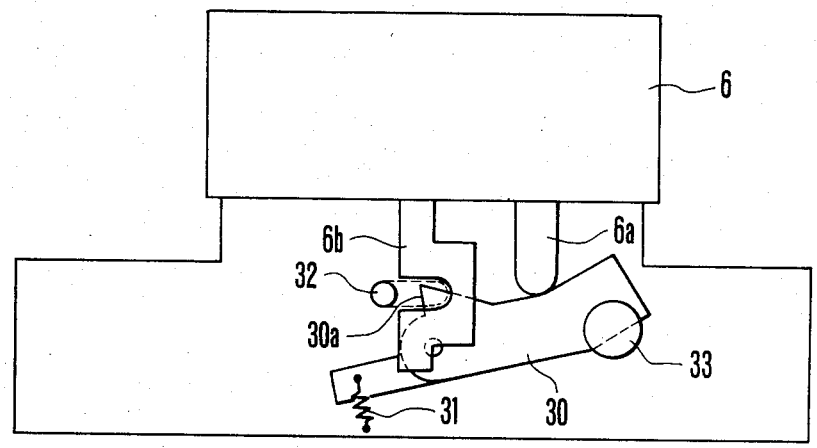
FIG. 2(C) is similar to FIG. 2(A) except that the close-up position is illustrated.

FIG. 2(C) represents a predetermined position intervening between the standard and telephoto positions, or a third position. It is in this position that the release lock member 30 is located just below the release button 33 so that the release button 33 is locked and a camera release cannot be actuated. On the other hand, when the cover unit 6 is in the third position, a recess of the close-up mode switch lock member 6b allows the close-up mode switch 32 to be moved to the right. Therefore when to make close-up photographs, the operator will first set the cover unit 6 in the third position, and then slidingly move the close-up mode switch 32 to the right as viewed in FIG. 2(C), whereby the camera is ready to make an exposure.

Figure 2D:
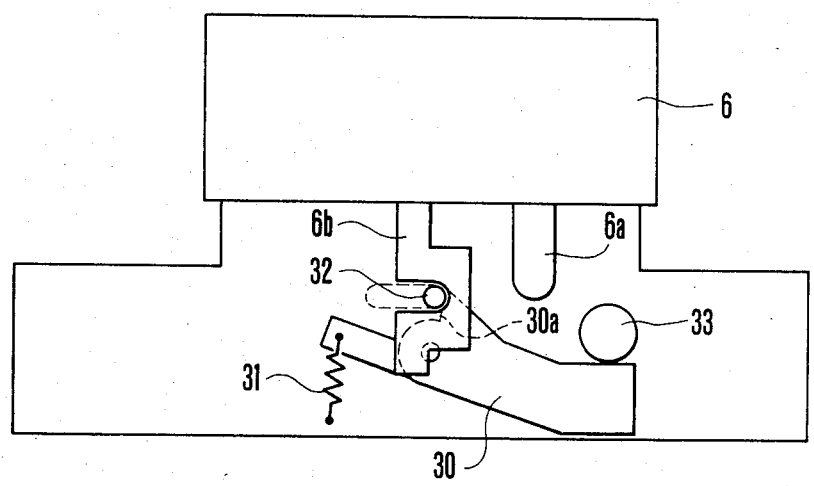
FIG. 2(D) is similar to FIG. 2(C) except that locking takes place in the close-up position.

FIG. 2(D) represents the close-up position. When the close-up mode switch 32 is moved from the position of FIG. 2(C) to the right as viewed in FIG. 2(C), the close-up mode switch 32 abuts on the pawled portion 30a of the release lock member 30 and then turns the release lock member 30 clockwise against the force of the spring 31, whereby the free end of the release lock member 30 is retracted from the path of the release button 33. Thus, the release locking is removed, and close-up photography becomes possible. Such rightward sliding movement of the close-up mode switch 32 also causes the close-up mode switch lock member 6b to be hindered from axial movement, because the close-up mode switch 32 enters the recess of the close-up mode switch lock member 6b. That is, the cover unit 6 is locked in the third position by slidingly moving the close-up mode switch 32 to the right. It is to be noted that the close-up mode switch 32 is operatively connected to a close-up mode display means, a switch for releasing automatic focusing control, and the like.

Figure 3:
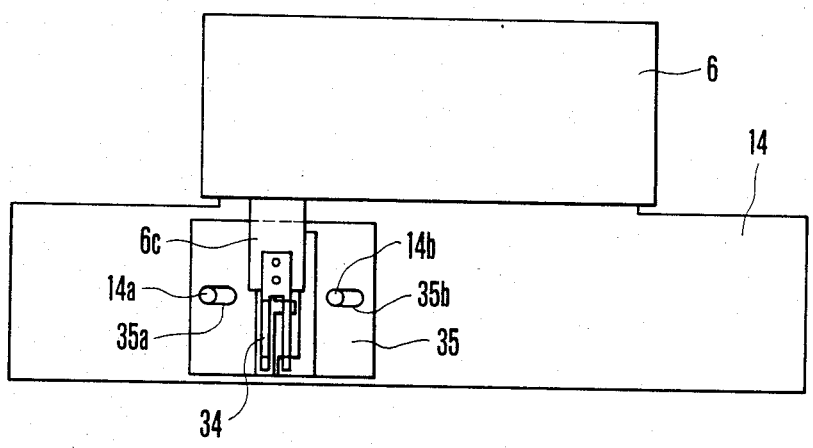
FIG. 3 is an elevational view of another release lock mechanism of electrical switches as modified from the release lock mechanism of FIGS. 2(A) to 2(D).
Figure 5:
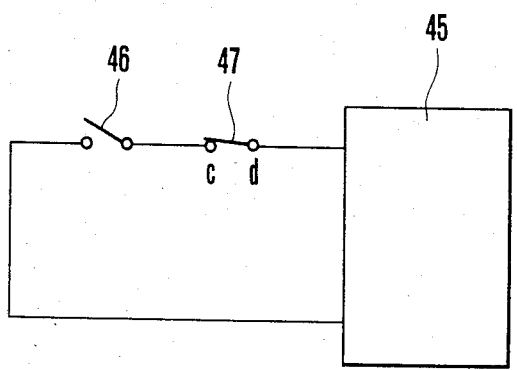
FIG. 5 is a block diagram of a control circuit of the camera including the switches of FIG. 3.

Though the release locking provision has been described in connection with the mechanical form by reference to FIGS. 2(A) to 2(D), another form of an electrical switch may be employed as illustrated in FIGS. 3 to 5. Once again, 6 is, as has been mentioned above, the cover unit, and 14 is the camera body.

The cover unit 6 has an extension 6c. Fixedly mounted to this extension 6c is a slider 34 made of electrically conductive material. The slider 34 is in pressure-contact with a print substrate 35. This print substrate 35 has laterally elongated slots 35a and 35b in which are engaged respective pins 14a and 14b vertically extending from the camera housing 14, and is operatively connected to the close-up mode switch 32. That is, the print substrate 35 is in abutting contact on the camera housing 14 and is slidingly movable in lateral directions. When the cover unit 6 moves longitudinally, the extension 6c also moves longitudinally, and the slider 34, too, moves longitudinally. Since the slider 34 moves while being pressed against a pattern provided on the print substrate 35, the slider 34 and the print substrate 35 can constitute a switch. FIG. 4 in enlarged scale illustrates the slider 34 and the pattern on the print substrate 35. FIG. 4(A) represents the standard photographing position, FIG. 4(B) the telephoto position, FIG. 4(C) a condition wherein the cover unit 6 is in the close-up position, and FIG. 4(D) another condition wherein the cover unit 6 is in the close-up position and the close-up mode switch 32 is in the ON state.

FIG. 5 in a schematic block diagram illustrates the circuitry of the camera. 45 is a control circuit. 46 is a release switch arranged to turn on when a button (not shown) is depressed. 47 is a release lock switch having a contact "c" corresponding to a patch 35c in the pattern of FIG. 4, and another contact "d" corresponding to another patch 35d in the pattern.

In FIGS. 4(A) to 4(D), the patch 35c is formed in a letter "T" shape with the down stroke shortened, and the patch 35d is "U" shaped with the limbs shortened, these patches 35c and 35d being positioned in mating relation to form the pattern. With the release lock switch 47 in the ON state, when the release switch 46 is turned on, the control circuit 45 starts to operate, and an exposure operation is carried out. With the release lock switch 47 in the OFF state, however, even when the release switch 46 is turned on, the control circuit 45 is left idle. Thus, release locking takes place, and no exposure operation occurs.

In the standard shooting position of FIG. 4(A), the two fingers of the slider 34 are located at the rear end portion of the cross-stroke of the patch 35c and the rear shortened limb of the patch 35d respectively, so that the two contacts "c" and "d" of the release lock switch 47 are closed. In other words, the two patches 35c and 35d are short-circuited by the slider 34, so that the release lock switch 47 is in the ON state, and the release locking is removed, whereby standard photography becomes possible. Even in the telephoto position of FIG. 4(B), the two fingers of the slider 34 are in contact with the respective patches 35c and 35d at the front end portion and the front limb respectively, so that the two patches 35c and 35d are short-circuited by the slider 34, so that the contacts "c" and "d" are closed, so that the release lock switch 47 is turned on, whereby the release locking is removed, allowing telephoto photography to be performed. As shown in FIG. 4(C), when the cover unit 6 is moved to the close-up position, both of the fingers of the slider 34 are in contact with the same patch 35c at the center of the cross-stroke and the down stroke respectively, and are out of contact with the opposite patch 35d. Or, when the cover unit 6 is being changed over between the standard and telephoto positions, the slider 34 is in contact with only the patch 35c, and not with the opposite patch 35d. Thus, release lock switch 47 is in OFF state, preventing an exposure operation. However, when setting of the cover unit 6 in the close-up position is followed by actuating the close-up mode switch (not shown in FIGS. 4(A) to 4(D)), that is, when the close-up mode switch 32 is slidingly moved to the right as shown in FIG. 2(D), the print substrate 35 is moved slidingly to the left, reaching a position of FIG. 4(D) where the two fingers of the slider 34 are brought into contact with the respective patches 35c and 35d at the down stroke and the center of the length of the bottom stroke respectively, so that the two patches 35c and 35d are short-circuited by the slider 34, or the two contacts "c" and "d" of the release lock switch 47 are closed. Thus, the release locking is removed, allowing close-up photography to be performed. It is to be noted here that when the cover unit 6 is moved away from the close-up position, the slider 34 is taken out of contact with the patch 35c. Thus, release locking is effected, and exposures become impossible.

Figure 6A:
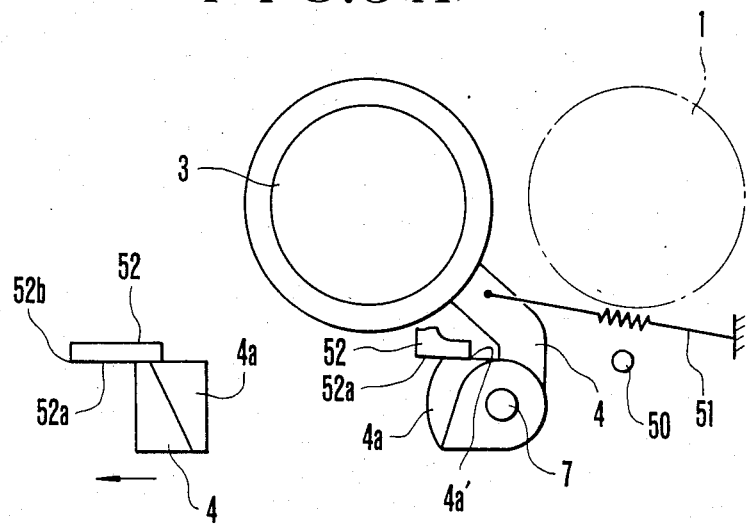
FIG. 6(A) illustrates a manner in which a mechanism for moving the auxiliary lens of FIG. 1 operates in the standard photographing position.
Figure 6B:
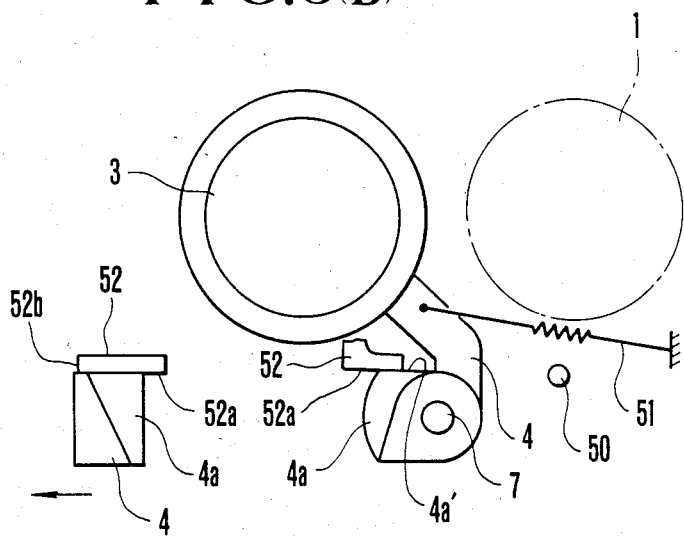
FIG. 6(B) is similar to FIG. 6(A) except that the auxiliary lens is in the close-up position.

FIGS. 6(A) to 6(D) illustrate an operating mechanism for the auxiliary lens system 3. FIG. 6(A) represents a location of the lens system when in the standard position of FIG. 1(A), FIG. 6(B) the same when in the close-up position of FIG. 1(C), FIG. 6(C) the auxiliary lens 3 in motion, and FIG. 6(D) the axial alignment of the auxiliary lens 3 with the master lens 1 in the telephoto position of FIG. 1(B).

In FIGS. 6(A) to 6(D), 1 is the master lens, 3 is the auxiliary lens, and 4 is the extender. Formed in the extender 4 is a camming surface 4a. 7 is an axis of rotation of the extender 4, and 4a' is an upper flat portion of the camming surface 4a. A pin 50 limits the clockwise movement of the extender 4 to a position at which the auxiliary lens 3 is held in axial alignment with the master lens 1. A spring 51 urges the extender 4 in a clockwise direction. A control member 52 is fixedly mounted to the holder plate 9 and has a bottom surface 52a and a side surface 52b.

Figure 6C:
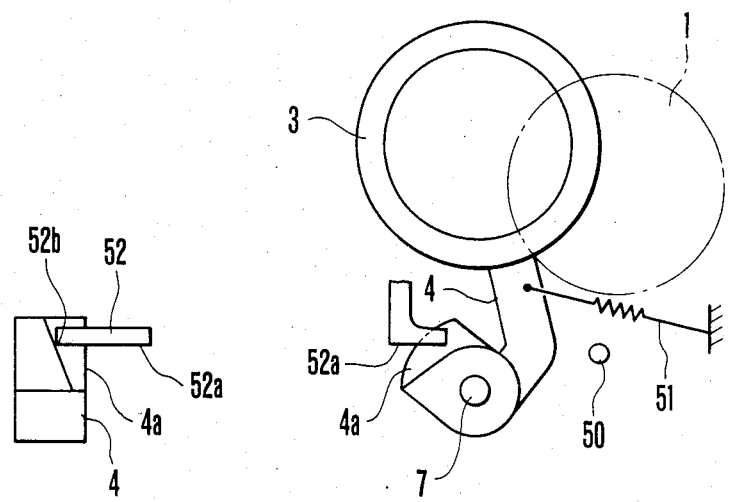
FIG. 6(C) is similar to FIG. 6(A) except that the auxiliary lens is in motion.
Figure 6D:
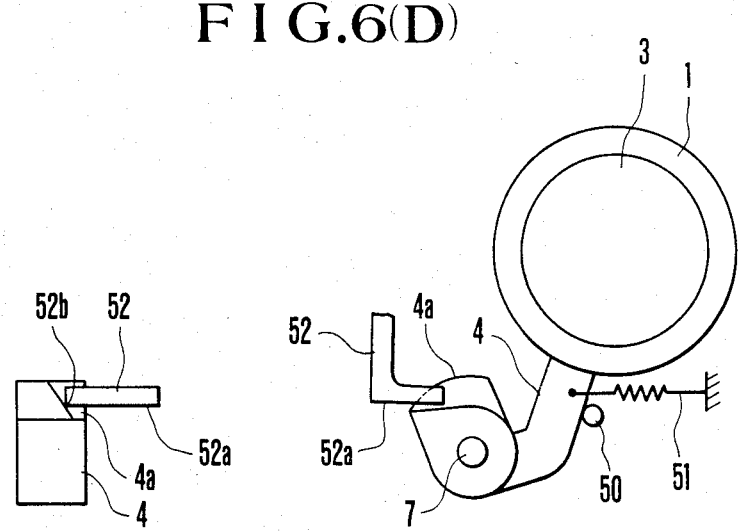
FIG. 6(D) is similar to FIG. 6(A) except that the auxiliary lens is in the telephoto position.

The operation of the mechanism of such construction is as follows: As the cover unit 6 is moved forward from the position of FIG. 1(A), the positions of FIGS. 6(A) and 6(B) occur successively. Since, however, the control member 52 has a depth of a predetermined dimension, it is during the time when the cover unit 6 moves from the FIGS. 1(A) to FIG. 1(C) position that the upper flat surface 4a' of the cam 4a of the extender 4 slidingly moves in abutting engagement against the bottom surface 52a of the control member 52. Therefore, up to the position of FIG. 6(B), the extender 4 is left unchanged from the position of FIG. 6(A). In other words, during this time, the auxiliary lens 3 does not enter a space behind the master lens 1, permitting only forward movement of the cover unit 6. Then when the cover unit 6 is moving from the position of FIG. 1(C) to the position of FIG. 1(B), the upper flat camming surface 4a' of the extender 4 gradually moves away from the bottom surface 52a of the control member 52, and the slant camming surface 4a succeeds to contact with the corner 52b of the control member 52. That is, the position of FIG. 6(C) is passed. As forward movement of the cover unit 6 goes on, the extender 4 turns clockwise. When the extender 4 is stopped from further clockwise movement by the pin 50, axial alignment of the auxiliary lens 3 to the master lens 1 is established as illustrated in FIG. 6(D). Thus, telephoto photography becomes possible.

As has been described in greater detail above, the present invention aims to provide a focal length changeable camera having a master lens arranged in a standard position to constitute a first focal length lens system and upon forward axial movement from that position to insert an auxiliary lens into a space behind the master lens in axial alignment therewith so that a second focal length lens system is formed for telephoto photography, wherein the auxiliary lens is made to remain stationary in a retracted position from the optical path behind the master lens during the time when the master lens is moved forward from the standard shooting position to a predetermined intermediate position between the standard and telephoto shooting positions, and wherein the master lens is locked in said predetermined intermediate position by moving a close-up mode switch member to an active position, thereby giving advantages that such focal length changeable camera having the additional capability of close-up photography can be constructed in a very simple form, and that there is no possibility of occurrence of accidental movement of the master lens during the close-up operation so that the percentage of photographs taken out of focus with the close-up position is greatly reduced.

Another feature is that the camera is rendered prohibitive from actuation of a camera release in response to forward movement of the master lens, except when the master lens is in the standard position or in the telephoto position, whereby faulty operation of the camera can be avoided.

A further feature is that even in the close-up position, the aforesaid camera can be made to release from the locking connection of the camera release actuator by rendering the camera operative in the close-up mode. Therefore, it is possible to avoid faulty operation even when in the close-up position.

While specific embodiments of the invention have been shown and described in detail to illustrate the application of the inventive principles, it will be understood that the invention may be embodied otherwise without departing from such principles.

What I claim:

1. A focal length changeable camera comprising:
   (a) a master lens system;
   (b) first moving means for moving said master lens system along an optical axis of said master lens system,
      said first moving means being movable between three positions, consisting of a position for moving said master lens system axially forward, another position for effecting no forward movement, and a predetermined position intervening therebetween;
   (c) an auxiliary lens system;
   (d) second moving means for moving said auxiliary lens system between a position where it is in the optical path of said master lens system and another position where it is retracted from said optical path,
      said second moving means moving said auxiliary lens system into the optical path when said first moving means is moved axially forward from said predetermined intermediate position; and
   (e) lock means for holding said first moving means stationary in said predetermined position, said lock means being actuated by setting a close-up photography mode.

2. A focal length changeable camera according to claim 1, further comprising:
   prohibiting means for prohibiting release operation unless the first moving means is at one of said two positions other than the predetermined position, said prohibiting means being released by the operation of said lock means.

3. A camera according to claim 2, wherein said prohibiting means is a member for blocking a release button in response to movement of said first moving means.

4. A camera according to claim 2, wherein said prohibiting means is a switch whose operation is controlled in response to movement of said first moving means, and wherein said switch renders a control circuit of said camera inoperative.

* * * * *